United States Patent [19]
Lira

[11] Patent Number: 6,165,522
[45] Date of Patent: Dec. 26, 2000

[54] PROCESSED FOOD AND A METHOD FOR MAKING A PROCESSED FOOD PRODUCT FOR MASS DISTRIBUTION

[76] Inventor: Alfredo S. Lira, 6230 Lindy Ann L., Houston, Tex.

[21] Appl. No.: 09/311,486

[22] Filed: May 13, 1999

[51] Int. Cl.[7] .............................. A21D 13/00; H23G 3/00
[52] U.S. Cl. ........................... 426/94; 426/556; 426/500; 426/501
[58] Field of Search .................................... 426/556, 500, 426/94, 501

[56] References Cited

U.S. PATENT DOCUMENTS

| | | | |
|---|---|---|---|
| 4,438,145 | 3/1984 | Bakker | 426/297 |
| 4,961,948 | 10/1990 | Hee | 426/556 |
| 5,281,120 | 1/1994 | Morikawa et al. | 426/115 |
| 5,508,050 | 4/1996 | Miki et al. | 426/297 |
| 5,780,091 | 7/1998 | Cassetta et al. | 426/557 |
| 5,814,360 | 9/1998 | McDilda et al. | 426/94 |
| 6,001,400 | 12/1999 | Burger | 426/94 |
| 6,007,858 | 12/1999 | Gum et al. | 426/297 |
| 6,010,730 | 1/2000 | Okaizumi et al. | 426/501 |

*Primary Examiner*—Nina Bhat
*Attorney, Agent, or Firm*—Bracewell & Patterson, L.L.P.

[57] ABSTRACT

A food product suitable for high volume production is formed of varied layers such as breads or doughs, vegetables, dairy products, meats and various spices and sauces. The product may be mass produced with a minimum of manual labor and includes an edible outer shell or casing made of a pliable material and a filling generally made of a different food product such as meat, vegetables, eggs, cheeses, various sauces or combinations of these ingredients. The pliable first layer forms an outer "shell" or crust which is covered with a pliable second layer of desirable food ingredients. The two layers are then rolled together about a common axis to form a spiral, layered food product having alternating "layers" of crust and filling. Additional layers may be added as additional ingredients are desired for the final product. The resulting food product is a rolled product having uniform layers of ingredients throughout the product assembly.

20 Claims, 3 Drawing Sheets

PROCESSED FOOD AND A METHOD FOR MAKING A PROCESSED FOOD PRODUCT FOR MASS DISTRIBUTION

BACKGROUND OF THE INVENTION

1. Field of the Invention

The subject invention relates to a processed food and a method for making a processed food product suitable for mass distribution and is specifically directed to a processed food and a method for making a processed food having a pliable, outer food shell and an inner food filling.

2. Discussion of the Prior Art

The fast food industry generally supplies mass marketed finger-type food, i.e., food which can be eaten without utensils. Typically, such food ranges from sandwiches such as hamburgers and french fries to various ethnic or specialty foods such as, by way of example, burritos, tacos and the like. As "fast food" has become more acceptable, there is a continuous problem of providing good quality food while at the same time meeting high volume production requirements.

When such foods are made in the standard manner, the production is very labor intensive. On the other hand, when such foods are made as an assembly-line manufactured product and shipped to the retail sale destination, quality suffers. There is a need for high-volume, manufactured food products that have the quality of handmade, point-of-sale prepared foods.

Another issue with the point-of-sale assembled foods is the integrity of the final assembly. Typically, when such products are made the food ingredients are loosely assembled. This makes the products less than desirable as "finger foods" where the foods are picked-up and eaten without utensils. Often the loosely packed ingredients will fall out of the outer shell when the food is picked up, especially after the product has been partially eaten. This is particularly true of products intended to be consumed by young children. This causes both waste of the food product and an undesirable sanitation problem.

It is common for such product to be eaten in personal cars while traveling, both by the driver and by the passengers. When such foods have a tendency to fall apart when held and eaten this can create a safety hazard as the driver's attention is diverted from the highway to the food in his hand. There are reports of numerous accidents caused by attempts to manage food while eating and driving.

In the past, processed or manufactured food assembly products, such as a hamburger sandwich or other food product having multiple components, have been pre-cooked, assembled and then frozen for shipment to the point-of-sale, where the food is warmed to serving temperature. While this permits the food to be mass produced off site, the resulting product is usually less than desirable. To date, there are not any known methods of assembling large volumes of food products at the point-of-sale without resorting to manual, labor intensive assembly methods.

This is particularly true of layered foods where meat products, vegetable products, breads and various condiments are layered to provide a finished product. Examples of such products are hamburger sandwiches, pizzas, and Mexican foods such as burritos and the like. At the present time, these products are constructed layer-by-layer at the point of sale in a manual, labor intensive system.

It would be desirable to make such products in a manner preserving the quality of point-of-sale assembly while at the same time reducing the amount of manual labor required in the process.

SUMMARY OF THE INVENTION

The subject invention is directed to a food product and a method of making a food product suitable for high volume production while at the same time preserving or exceeding the quality of point-of-sale assembled foods. The invention is specifically directed to a food product and the process for making high volume layered food products including varied layers such as breads or doughs, vegetables, dairy products, meats and various spices and sauces.

The method of the invention permits such products to be mass produced with a minimum of manual labor. In the preferred embodiment, the food products includes an edible outer shell or casing made of a pliable material and a filling generally made of a different food product such as meat, vegetables, eggs, cheeses, various sauces or combinations of these ingredients. In the preferred embodiment of the invention, a pliable first layer which is designed to form an outer "shell" such as a crust or the like is covered with a pliable second layer of desirable food ingredients also formed into a pliable layer. The two layers are then rolled together about a common axis to form a spiral, layered food product having alternating "layers" of crust and filling. Additional layers may be added as additional ingredients are desired for the final product.

The resulting food product is a rolled product having uniform layers of ingredients throughout the product assembly, making a better final product. By using suitably thin layers of ingredients wound in a spiral fashion in accordance with the subject invention, the tendency of the filling layers to fall out of the shell or casing is almost completely eliminated. In addition, by controlling the thickness of the various layers throughout the product, more uniform and predictable cooking is assured. There is also better control of the various ingredients throughout the product, providing expected ratios of shell and filling in each bite.

This provides a higher quality final product, assuring a consistent quality of the final, delivered product, and at the same time provides a portable food product that can be eaten without utensils with a minimum chance of spillage. The layered product is also more uniform in appearance, providing a consistent, predictable product offering.

While the outer layer is intended to be a pliable sheet, such as bread dough, pizza dough or a corn tortilla or the like, the inner layer or layers may be loose ingredients or may also be in a sheet configuration. For example, a first, crust layer may be a soft tortilla, with loose egg and cheese product formed into a sheet for defining the filling layer. When the product is rolled, the egg and cheese product will be "sandwiched" between the tortilla layer in a spiral roll, providing a relatively tightly wound end product with consistent ratios of crust and filling in each bite.

The first or crust layer has one dimension which is larger than the filling layer or layers, providing a perimeter around the entire filling layers. When the product is rolled, the resulting outer crust edge is secured to the abutting crust portion by suitable edible means such as, by way of example, Gar glue or the like. In an alternative embodiment of the invention, the longitudinal length of the crust layer may be larger than the filling layers, providing a crust end which may be crimped and secured, or folded, to assure that the filling layers do not fall through open ends of the product.

In an alternative embodiment, the crust layer may be a continuous product, with the filling layers placed thereon in a continuous process. The layers are rolled about their common longitudinal axis to provide a spiral assembled food product which is then radially sliced to form a food product of desired size.

In another embodiment of the invention, the filling ingredients may be loose and distributed on the crust layer prior to rolling.

The resulting assembled food product has uniform consistency throughout the assembly, has a uniform outer appearance, and is portable and suitable for consumption as a finger food, with a minimum likelihood of spillage. The product is pleasing to the eye, as well.

It is, therefore, an object and feature of the subject invention to provide a food product having a plurality of layered ingredients, wherein the food product may be eaten as a finger food with a minimum of mess and waste.

It is another object and feature of the subject invention to provide an assembled food product wherein each of the various layers are uniform, enhancing appearance and improving cooking quality.

It is an additional object and feature of the invention to provide an assembled food product that may be manufactured in high volume quantities with a minimum of manual labor.

Other objects and features of the invention will be readily apparent from the accompanying drawings and detailed description of the preferred embodiment.

DETAILED DESCRIPTION OF THE PREFERRED EMBODIMENT

Figure 1:
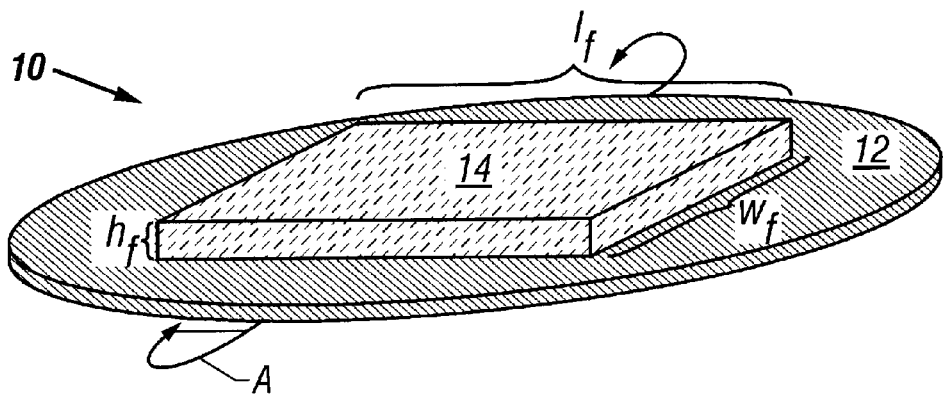
FIG. 1 is a perspective view of the food product layers prior to spiral rolling of the product.
Figure 2:
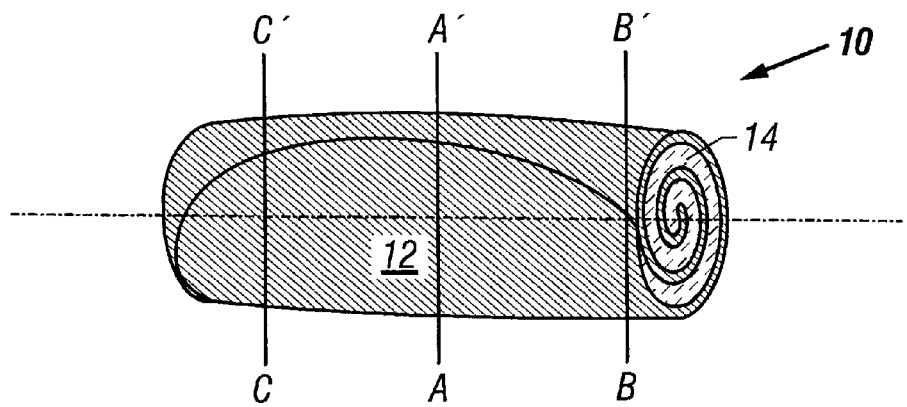
FIG. 2 is a perspective view of the food product of FIG. 1 after being spirally wound into a roll.
Figure 3:
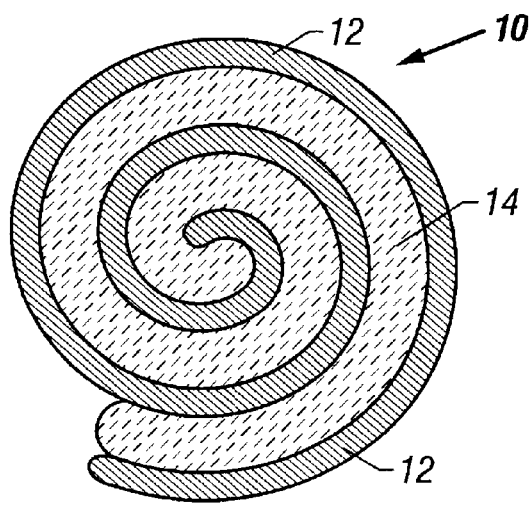
FIG. 3 is a sectional view of the product of FIG. 2, taken along lines 3—3 of FIG. 2.
Figure 4:
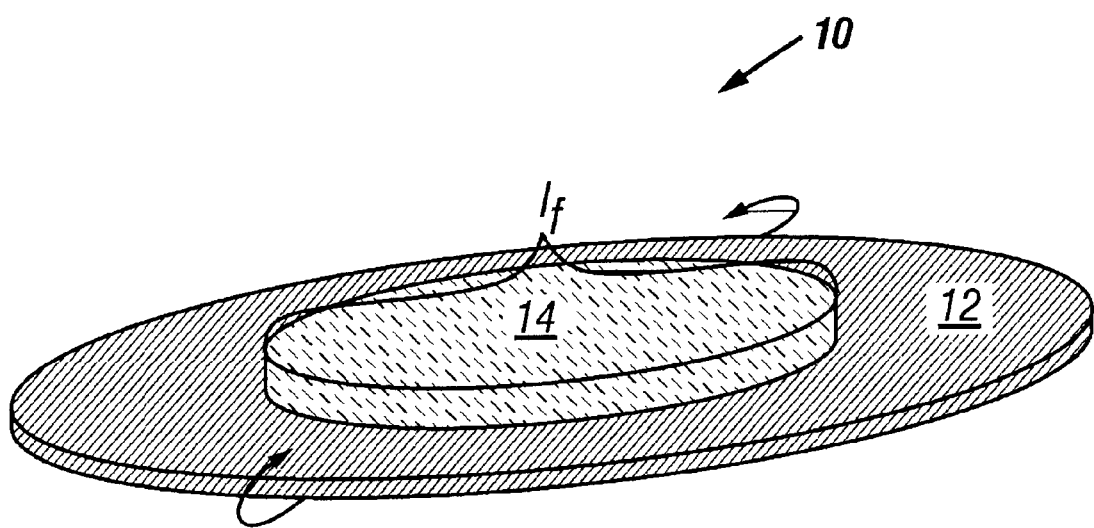
FIG. 4 is a perspective view of an alternate embodiment of a product according to the present invention.

The basic food product 10 of the subject invention is illustrated generally in FIGS. 1, 2 and 3. In the preferred embodiment, an edible, pliable outer layer 12 provides a shell or crust. The shell 12 is of a larger peripheral size than the filler layer or layers 14. The filler 14 may be a single food product or a mixture of food products, or may be multiple layers. The essential requirement is that the filler layer or layers 14 be of a width $W_f$ and a length $L_f$ which assures that all portions of the filler are within the boundaries of the shell 10. The resulting open edges along the dimension $W_f$ are then rolled to create the spirally rolled food product, as shown in FIGS. 2 and 3. In the embodiment shown if FIG. 1 the crust or shell layer 12 is in a circular shape and the filling 14 is rectangular. In order to provide the most uniform distribution of filling throughout the product, it may be desirable that the filling product be of the same general shape as the shell, but of a slightly smaller dimension, such as, by way of example, concentric circles, as shown in FIG. 4, or nested squares. Depending on the consistency of the filling, it may also be desirable that the filling dimension $L_f$ be the same as or smaller than the same dimension of the shell.

In the preferred embodiment of the invention, the shell 10 is rolled onto the filler 12 as shown at arrow A and then the entire product is rolled, as shown in FIG. 2, producing the spirally rolled product as shown in FIG. 3, with spirally wound, interleaved shell and filler layers. Where the filling layer 14 is completely circumscribed by the shell layer 12, as in the configuration of FIG. 1, the resulting product is a roll with an outer shell or casing 12, and a filler 14, having an axis along the length Lf of the filler, as shown in FIG. 3. The end edges of the shell layer 12 along dimension $L_f$ may then be tucked or folded inward to further prevent spillage.

The spiral product of FIG. 3 may then be served as a finished product, or where desired, may be cut through the spiral axis to provide uniform, consistent individual serving sizes in the shaped of disks. This results in a desirable food product which may be produced in high volume, with a predictable quality, controlled serving size and a desirable appearance. It is particularly well-suited for finger foods as served by "fast food" restaurants, particularly where loose filling products are desired, such as taco fillings, breakfast foods such as eggs and potatoes, and the like. In the preferred embodiment, the loose filling product are pressed into sheets before being introduced onto the shell layer and prior to rolling. However, it is possible to use loose fillings, such as a mixture of grated cheese, grated onions and ground beef, and still achieve a more stable product than current foods with loose fillings place on a bun or the like. The resulting wound product provides better securing of the filling in the shell than the layered products of the prior art.

Examples of products for which very desirable results have been achieved are round, soft flour tortillas filled with a scrambled egg and cheese sheet product. The egg and cheese may be placed on in separate layers, or grated cheese may be mixed in with the egg to form a single filling layer. In the preferred embodiment, the egg and cheese filling layer is also of a flat, generally circular shape, as shown in FIG. 4. Once the egg filling layer 14 is placed on the tortilla shell 16, one outer edge of the tortilla shell 12 is rolled toward the axis $L_f$ and continued to be rolled until a spiral is created as shown in FIG. 3. The opposite outer edge of the tortilla is then attached to the exposed outer shell, as previously described, to form the finished product. Condiments such as salsa, loose onions or other ingredients may be added as loose ingredients prior to rolling. The resulting end product is an attractive, stable, tasty food product with good stability to used as a finger food.

Almost any desired selection of filler ingredients may be made into a sheet layer configuration, making the present invention very flexible in application to the fast food industry. For example, a cheeseburger may be made in this manner by pressing the meat and cheese into a relatively flat sheet to be placed upon the flat shell or crust layer. The resulting assembly is then spirally rolled to create a spiral cheeseburger product which has the same taste as previously discretely assembled hamburger sandwiches. The variety of products is virtually unlimited. Any vegetable product, meat product and bread or crust product may be assembled in this manner.

In the preferred embodiment, the method for making the final assembled food product is fully automated. The various ingredients may be cooked independently of one another, cooked as discrete layers or cooked as a final assembly depending on the various temperatures and times required to cook each of the ingredients. In the preferred form, the product will be pre-cooked and either fresh or frozen shipped to destination, where final cooking is completed just prior to serving.

Figure 5:
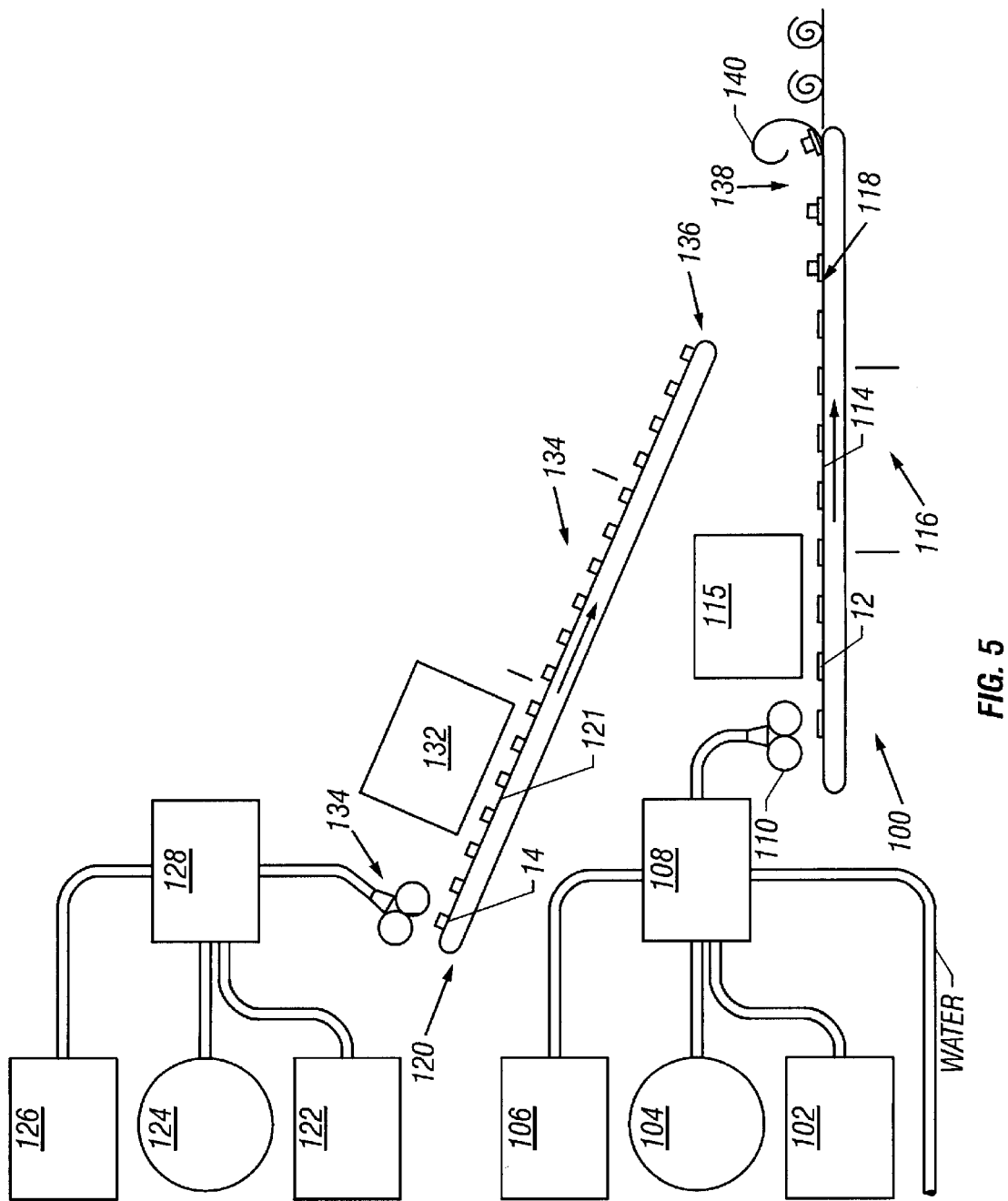
FIG. 5 is a diagrammatic illustration of the assembly line machinery for manufacturing a food product in accordance with the subject invention.

A mass production system for making a food product in accordance with the subject invention is shown in FIG. 5. As there shown, a tortilla shell or similar crust or bread product 12 is manufactured and transferred along a lower conveyor system 100. In the preferred embodiment, all of the various tortilla shell ingredients are stored in separate bins 102, silos 104 and towers 106. The various ingredients, such as flour from silo 104, salt from bin 102 and shortening from tower 106 are metered into a blender or mixer 108 where the ingredients are mixed to a desired consistency. The resulting mixture is then metered into a roller press 110 for forming discrete, generally circular tortillas 12 which are deposited on the moving conveyor 114. Tortillas 12 then proceed through a cooking oven 115, and an air cooling zone 116 and exit at the exit point 118 as finished, warm, soft and pliable tortillas.

A second, upper conveyor system 120 is provided above the conveyor system 100. Filler products are similarly stored in bins 122, silos 124 and/or towers 126, metered and blended at filling blender 128 and thereafter metered onto a roller press 130 for forming discrete, generally circular filling layers 14. The filling layers 14 progress along conveyor 121 and are either cooked or precooked in the oven 132 and cooled as required in cooling zone 134. The conveyor 121 then conveys the filler to the terminus point 136, where the filling sheets 14 are released and deposited on the tortilla shells 12 on conveyor 114. The resulting layered product is then rolled at roller zone 138 by means of the automated roller 140, or by hand, with the outermost exposed edge of the tortilla shell secured to the shell spiral by suitable, edible means such as Gar glue or the like.

While certain embodiments and features of the invention have been shown and described in detailed herein, it will be understood that the invention includes all modifications and enhancements within the scope and spirit of the following claims.

What is claimed is:

1. A layered, spirally wound food product of the type suited for providing a mass produced, high volume product of consistent serving size, appearance and quality, the food product comprising:
   a. a shell layer made of a pliable edible sheet material and having a longitudinal dimension and a width dimension and having a base area to receive a food ingredient and outer edge areas extending beyond the base area;
   b. a filler layer made of at least one cooked food ingredient and placed after cooking on the base area of the shell layer such that the outer edge areas of the shell layer are exposed;
   c. a first outer edge area of the shell layer being rolled over onto the filler layer; and
   d. the filler layer and the shell layer being rolled toward an outer edge area opposite the first outer edge area to form a rolled product having spirally interleaved layers of edible sheet material and at least one cooked food ingredient.

2. A food product as claimed in claim 1, wherein the filler layer is within the width dimension of the shell layer.

3. A food product as claimed in claim 2, wherein the filler layer is within the longitudinal dimension of the shell layer.

4. A food product as claimed in claim 1, wherein the filler layer is within both the width dimension and the longitudinal dimension of the shell layer.

5. A food product as called for in claim 1, wherein at least one outer edge area of the shell layer is adapted to be folded onto the filler layer.

6. A food product as called for in claim 5, wherein the outer edge area of the shell layer is adapted to be folded onto the said one outer edge area, whereby the filler layer is circumscribed by the shell layer to form the generally cylindrical product.

7. A food product as called for in claim 1, wherein said filler layer is made of a single food ingredient.

8. A food product as called for in claim 1, wherein said filler layer is made of multiple food ingredients in a homogeneous mixture.

9. A food product as called for in claim 1, wherein said filler layer is a sheet material.

10. A food product as called for in claim 1, wherein said filler layer is made of multiple food ingredients blended into a single sheet layer of cooked food material.

11. A food product as called for in claim 1, said shell layer comprising a generally circular tortilla.

12. A food product as called for in claim 11, wherein the filler layer is generally circular and is of a diameter smaller than the tortilla.

13. A food product as called for in claim 12, wherein the filler layer is placed on the shell layer in generally concentric circular layers.

14. A food product as called for in claim 11, the filler layer comprising an egg mixture.

15. A method for making a spirally wound food product comprising a shell layer made of a pliable edible sheet material and a filling layer made of at least one cooked food ingredient the shell layer and the filler layer being wound about a common axis to form spirally wound, interleaved layers of edible sheet material and at least one cooked food ingredient, the method comprising the steps of:
   a. blending flour, shortening and salt to form a shell dough;
   b. compressing the dough into a shell sheet of predetermined thickness;
   c. heating the shell sheet to a desired finished temperature to form the pliable, edible sheet material;
   d. simultaneously blending a filling product containing at least one food ingredient;
   e. compressing the filling product to form a filling sheet of predetermined thickness;
   f. heating the filling sheet to cook same to a finished temperature;
   g. placing the cooked filling sheet superimposed on the shell sheet;
   h. rolling the pliable edible shell sheet and superimposed cooked food ingredient filling sheet together about a common axis to form a rolled product having spirally interleaved layers of edible sheet material and at least one cooked food ingredient; and
   i. securing the spirally interleaved layers of edible sheet material and at least one cooked food ingredient together in the spiral.

16. The method of claim 15, further comprising the step of gluing the layers together in the spiral.

17. The method of claim 15, wherein the shell sheet is of a generally circular configuration.

18. The method of claim 17, wherein the filling sheet is of a generally circular configuration.

19. The method of claim 18, wherein the shell sheet is of a greater diameter than the filling sheet.

20. The method of claim 19, wherein the filling sheet and shell sheet are disposed concentrically when the cooked filling sheet is superimposed on the shell sheet.

* * * * *